United States Patent [19]

Stubbs

[11] 4,431,159

[45] Feb. 14, 1984

[54] VALVE AND COMPONENTS THEREFOR

[75] Inventor: George A. Stubbs, Warrington, England

[73] Assignee: British Nuclear Fuels Limited, Cheshire, England

[21] Appl. No.: 280,780

[22] Filed: Jul. 6, 1981

[30] Foreign Application Priority Data

Jul. 24, 1980 [GB] United Kingdom ................. 8024276

[51] Int. Cl.³ .......................................... F16K 31/122
[52] U.S. Cl. ................................ 251/63.6; 251/335 B; 251/368; 137/554
[58] Field of Search ...................... 251/368, 335 B, 62, 251/63.6, 63.5; 137/554

[56] References Cited

U.S. PATENT DOCUMENTS

| 2,101,970 | 12/1937 | Wissler | 251/368 |
| 2,584,161 | 2/1952 | Scherer | 251/368 |
| 3,052,445 | 9/1962 | Kessler | 251/368 |
| 3,095,900 | 7/1963 | Newhall | 251/368 |
| 3,185,437 | 5/1965 | Rice | 251/368 |
| 3,251,575 | 5/1966 | Campbell et al. | 251/368 |
| 3,390,943 | 7/1968 | Myers | 137/554 |
| 4,237,920 | 12/1980 | Norman | 251/335 B |

Primary Examiner—A. Michael Chambers
Attorney, Agent, or Firm—Larson and Taylor

[57] ABSTRACT

An aluminium valve which has a seat of stainless steel. This seat is provided by friction welding stainless steel onto aluminium and then shaping the composite to size. The stainless steel can be covered with stellite. The valve is closed by abutment of a PTFE bush onto the seats. The seat can comprise a slope so that any contaminatory material tends to be forced off the seat by the bush in use.

3 Claims, 5 Drawing Figures

VALVE AND COMPONENTS THEREFOR

This invention relates to valves and components therefor.

The invention has a particular, though not exclusive, application in systems where expensive radioactive or toxic gases are transmitted.

A problem with valves used in such environments is that corrosive products can build up and damage the seating of the valve. One type of valve has a polytetrafluorethane (PTFE) bush which is urged into abutment with an aluminium seat. Unfortunately, the aluminium mating face wears relatively quickly and the wear is enhanced by swarf which tends to accumulate near the PTFE bush. Therefore, the valve may begin to leak.

An object of the present invention is to tend to provide an improved valve having a longer reliable life.

According to the present invention, a valve comprises an operating spindle in a body, which body comprises an insert carrying a seat on which the spindle can sealingly sit, the insert comprising a stainless steel friction welded to an aluminium carrier, said carrier being sealingly attachable to the housing. Preferably, the spindle comprises a nickel loaded PTFE bush. Advantageously, the stainless steel seat comprises a partly inwardly tapered annular member. At least part of the insert may be externally threaded so as to engage within the body. The carrier may be welded to the body.

Also included in the present inventive concept is an insert for a valve, which insert comprises a partly inwardly tapered stainless steel annular member which is friction welded to an aluminium carrier.

Two embodiments of the present invention will now be described, by way of example only, with reference to the accompanying drawings in which.

Figure 1:
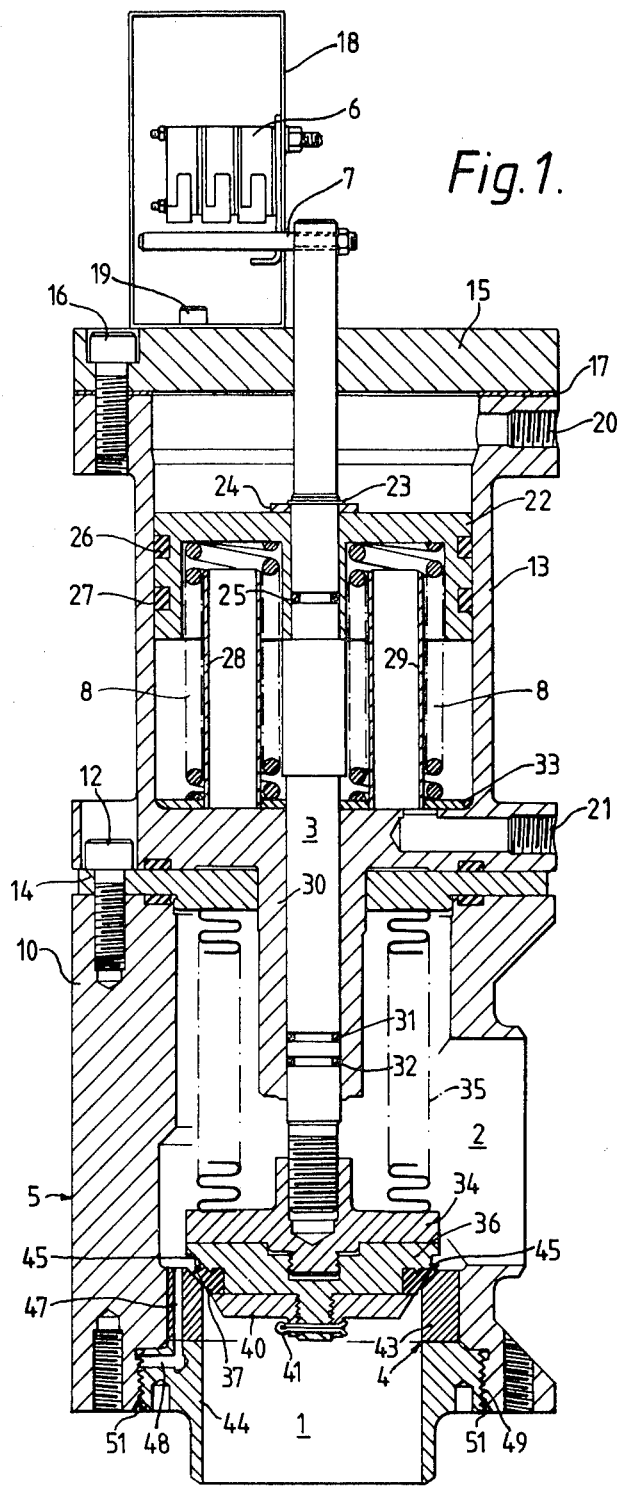
FIG. 1 is a vertical section through a valve.
Figure 2:
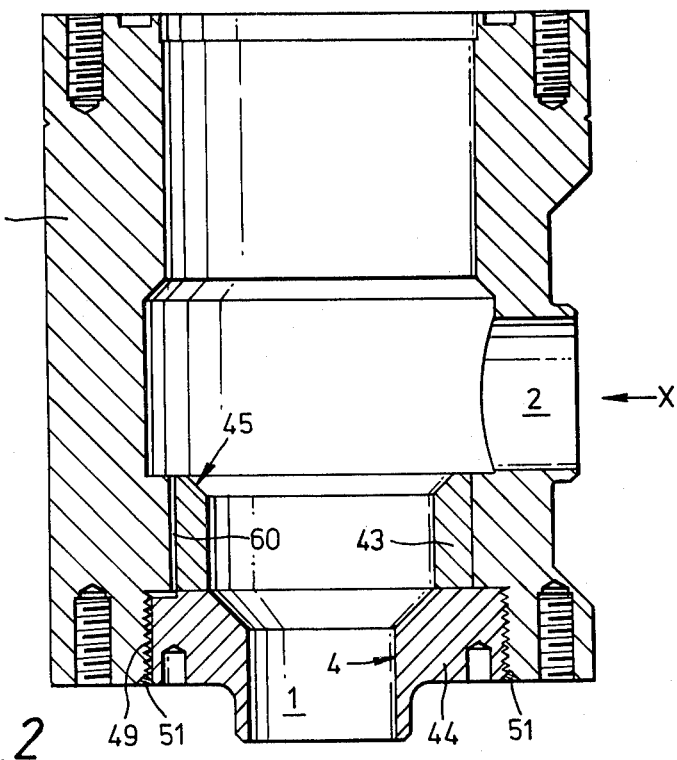
FIG. 2 shows a housing component for a valve similar to that shown in FIG. 1.
Figure 3:
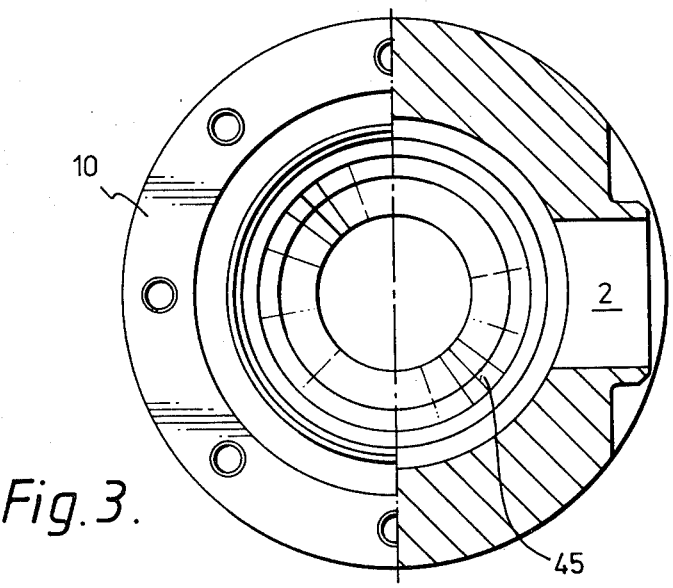
FIG. 3 is a partly sectioned plan view of FIG. 2.
Figure 4:
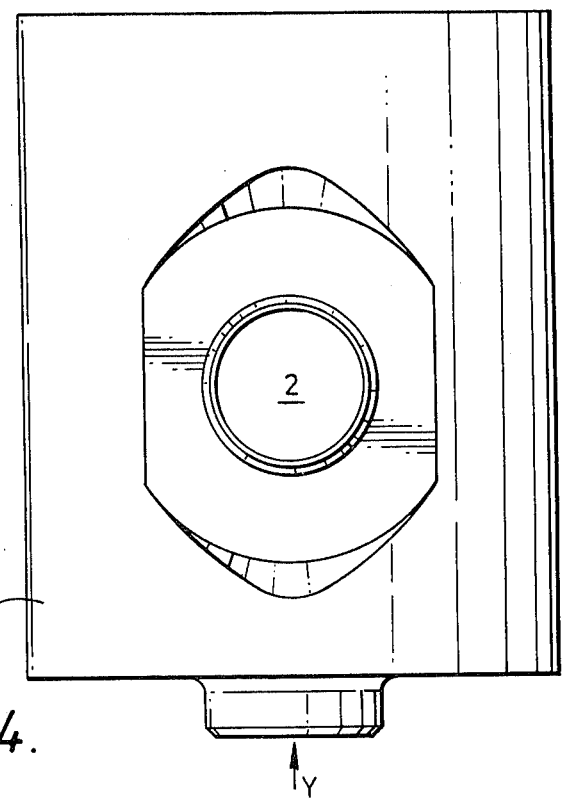
FIG. 4 is a view on arrow X in FIG. 2.
Figure 5:
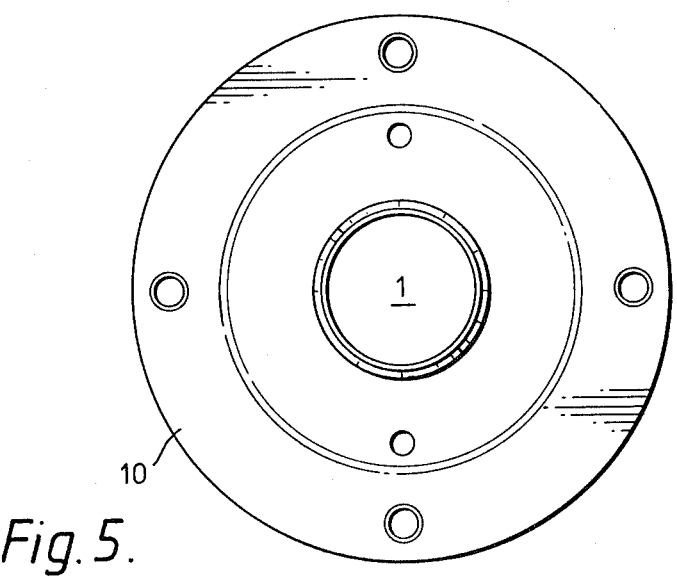
FIG. 5 is a view on arrow Y of FIG. 4.

Reference is directed firstly to FIG. 1, from which it can be seen that the valve includes ports 1 and 2 and has an open position, in which position fluid access is provided between the ports and a closed position, wherein such access is not provided. The valve is shown closed in the Figure. The valve comprises a spindle 3 which seats upon an insert 4 attached to a housing 5. The spindle 3 moves down and up to close and open the valve under the action of pneumatic pressure and spring bias, respectively. Opening and closing of the valve is indicated by operation of limit switches 6 actuated by a pin 7 which is connected to the spindle 3. A coil spring 8 provides a resilient bias for the spindle 3 as will be explained below.

In more detail, the housing comprises a body 10 which is bolted with bolts 12 to an actuator cylinder 13 via a bellows carrying member 14. Seals between the body 10 and bellows carrying member 14 and between the bellows carrying member 14 and the actuator cylinder 13 are indicated by 11. The actuator cylinder 13 has a cover 15 bolted thereto with bolts, one of which is indicated by 16, and a gasket 17 is disposed between cover 15 and cylinder 13. A limit switch housing 18 is screwed to the cover 15 by fixing screws 19.

The actuator cylinder 13 contains a port 20, to which a pneumatic air supply (not shown) may be attached or which may act as an exhaust. A similar port 21 is provided further down the cylinder for a similar purpose. Only one of the bores acts as an exhaust at a time. However the spindle 3 has attached thereto a piston 22 via a circlip 23 and washer 24. The seal between the spindle and the piston is provided by an 'O' ring seal 25. 'O' ring seals 26 and 27 effect a fluid tight seal between the piston 22 and actuator cylinder 13. The springs 8 are located by hollow cylindrical supports 28 and 29 and rest on a lower seat 33. The spindle 3 is slidably attached in a lower portion 30 of cylinder 13 and sealed by two 'O' ring seals 31 and 32. However a bottom plate 34 is screwed to the spindle 3 and the plate 34 forms an attachment plate for a bellows seal 35, the upper attachment point of which is the previously mentioned bellows carrying plate 14. A spacer 36 is carried by the plate 34 and this plate carries a sealing bush 37. The bush 37 is made from a 50% nickel loaded polytetrafluorethane (PTFE) compound. The bush is held on the spacer by a retaining plate 40, itself retained by a split pin 41.

The insert 4 provided for the bottom part of the body 10 comprises an annular seat 43 for the bush 37, which annular seat is formed of a stainless steel (A1S1316L) and an aluminium carrier 44 which defines port 1. The stainless steel seat 43 has an upper inwardly tapered face 45. This face is coated with stellite for the purpose of hardening. The aluminium carrier 44 is attached to the seat 43 by friction welding. Manufacture of the insert 4 is, in fact, as follows:

(i) a cylinder of aluminium and a cylinder of stainless steel are arranged on the same longitudinal axis and rotated relative to one another at high speed by a lathe-like device, (ii) the cylinders are then rammed into one another by a pressure of about two tonnes per square centimeter, and (iii) the cylinders thereby friction welded are machined into the shape of the insert 4, i.e. made into annuli of the dimensions shown.

The insert 4 comprises two perpendicular bores 47, 48 which are interconnected and the purpose of which is explained below. The external surface of the aluminium carrier 44 carries threads 49 and these threads engage complementary threads on the body 10. The insert 4 and body 5 are assembled by:

(a) screwing the insert into the body 10, (b) welding at 51 around the joint between carrier 44 and body 10, (c) testing the valve for leaks by applying a vacuum to the joint of insert and body, tending to cause a leak if this will occur through bores 47, 48 and (d) if the test is satisfactory, finishing machining surface 45 in the valve.

Since the stainless steel seat 43 is of stainless steel and has a stellite coated mating face, it is resistant to wear and lasts substantially longer than aluminium. Moreover, any aluminium swarf which has been created by corrosive fluids in the system tends to be forced out of the valve by virtue of the shape of the mating surfaces of the bush 37 and seat 43. Since the bush 37 is a 50% nickel loaded PTFE bush, no static electrical charge is generated and particles are not attracted to and do not remain upon a bush.

The stainless steel seat is securely retained in the valve, owing to the friction welded aluminium attachment to the carrier, despite the fact that it is not possible to weld the stainless steel seat to the valve body 10 directly. A stellite face is provided on the stainless steel, such a face is not possible on aluminium, since the stellite does not remain on the aluminium.

The above described valve can be dis-assembled in use in order to replace the seals such as 31, 32. This is possible because the actuator cylinder 13 can be removed from the body portion 10 by unscrewing screws (not shown) which attach the cylinder 13 to the body portion 10. The spindle 3 can be unscrewed from the plate 34 in order to enable separation of the spindle 3 from the portion 30. During such replacement of seals, integrity of the valve is maintained because the bellows carrier plate 14 remains bolted to the body 10 by the bolts 12. Also, the bellows does not become detached at either end during such an operation.

Reference is now directed to FIGS. 2, 3, 4 and 5, wherein like reference numerals to FIG. 1 are used for like parts. These Figures show the body portion 10 in more detail. From these figures, it can be seen that the insert is a little different from that shown in FIG. 1, insofar as the bores 47 and 48 of that Figure have been replaced by a groove arrangement 60. The groove arrangement 60 comprises a continuous groove running from top to bottom of the insert down its outer wall. The groove 60 provides a channel whereby gas which may be trapped in the threads 49 between the carrier 44 and the body 10 may be removed. In this way, gas which may be trapped in the threads and which may have a potentially damaging effect in use, is removed from the threads when the system is evacuated before the valve is put into operation. Also, the insert defines a port diameter for port 1 which alters from a relatively narow bore at the outside of the valve to a relatively wider bore within the valve.

Operation of the valve is as follows:

(i) pneumatic pressure applied through port 20 acts on the piston 22 to move the spindle 3 downwardly to close the valve, (ii) pneumatic pressure is removed from the port 0 and the spring 8 urges the spindle upwardly to open the valve.

An open or closed state of a valve is indicated to a plant controller by operation of the limit switches 6. The switches 6 indicate an open position and other switches (not shown) a closed position. The valve can be arranged with the spring 8 above piston 22. In such an arrangement, pneumatic pressure is applied to port 21 to open a valve and the spring 8 to close the valve when pressure is removed.

In the construction of valve shown, the failure to safety position on pneumatic failure is to valve open by spring action and in the alternative arrangement, failure to safety would be to the closed position. Therefore, the former type of valve could be used on an exhaust system and the latter on an inlet system. It is to be understood that the insert 4 finds application in manual as well as automatic valves.

From the above description, it can be seen that an improved valve is provided.

I claim:

1. A valve comprising an operating spindle in a valve body, an insert in said valve body, said insert comprising a stainless steel annular seat member with a stellite layer on an inwardly tapered seat surface of said member and an aluminium carrier to which the stainless steel seat member is friction-welded, the carrier being externally screwthreaded for engagement with a corresponding screwthread in the valve body and externally welded to the valve body for sealing the insert in position, and a nickel loaded PTFE bush on said spindle for sealing engagement with said stellite layer on said tapered seat surface of said member on operation of said spindle to close the valve.

2. A valve according to claim 1, wherein channel means are provided for vacuum-testing the sealing engagement between said bush and said seat.

3. A valve according to claim 1, including a pneumatic valve actuator connected with said operating spindle for remote operation of said valve.

* * * * *